United States Patent
Mattstedt et al.

(10) Patent No.: US 8,833,081 B2
(45) Date of Patent: Sep. 16, 2014

(54) LOW PRESSURE STEAM PRE-HEATERS FOR GAS PURIFICATION SYSTEMS AND PROCESSES OF USE

(75) Inventors: Daniel Nicolaus Secundus Mattstedt, Hamburg (DE); Joseph P. Naumovitz, Lebanon, NJ (US); Sanjay Kumar Dube, Knoxville, TN (US)

(73) Assignee: ALSTOM Technology Ltd, Baden (CH)

( * ) Notice: Subject to any disclaimer, the term of this patent is extended or adjusted under 35 U.S.C. 154(b) by 25 days.

(21) Appl. No.: 13/171,862

(22) Filed: Jun. 29, 2011

(65) Prior Publication Data
US 2013/0000301 A1 Jan. 3, 2013

(51) Int. Cl.
| | | |
|---|---|---|
| *F01K 17/00* | (2006.01) | |
| *B01D 53/14* | (2006.01) | |
| *B01D 53/62* | (2006.01) | |
| *F01K 17/02* | (2006.01) | |
| *B01D 53/50* | (2006.01) | |
| *B01D 53/52* | (2006.01) | |
| *B01D 53/78* | (2006.01) | |

(52) U.S. Cl.
CPC ...... *B01D 53/1456* (2013.01); *B01D 2257/504* (2013.01); *B01D 2252/20478* (2013.01); *B01D 53/50* (2013.01); *B01D 53/52* (2013.01); *B01D 2257/308* (2013.01); *B01D 2252/102* (2013.01); *B01D 53/78* (2013.01); *B01D 2252/20421* (2013.01); *B01D 53/62* (2013.01); *B01D 2259/65* (2013.01); *F01K 17/02* (2013.01); *B01D 53/1425* (2013.01); *B01D 2252/20426* (2013.01); *B01D 2257/304* (2013.01)
USPC ............... 60/686; 423/220; 60/645; 60/648

(58) Field of Classification Search
USPC ........... 60/645, 670, 685–697, 653, 677–680, 60/646, 657, 648; 95/183; 700/274; 423/220
See application file for complete search history.

(56) References Cited

U.S. PATENT DOCUMENTS 4,198,378 A * 4/1980 Giammarco et al. ......... 423/220
5,067,972 A * 11/1991 Hemmings et al. ............. 95/173
(Continued)

FOREIGN PATENT DOCUMENTS

| EP | 1391669 A2 | 8/2003 |
| EP | 1 688 173 | 8/2006 |
| EP | 2 305 364 | 4/2011 |

OTHER PUBLICATIONS

Specker et al. The Potential Growing Role of Post-Combustion CO2 Capture Retrofits in Early Commercial Applications of CCS to Coal-Fired Power Plants; MIT Coal Retrofit Symposium, Mar. 23, 2009, Electric Power Research Institute, 2 cover pages, and pp. 1-11.
(Continued)

*Primary Examiner* — Christopher Jetton
*Assistant Examiner* — Laert Dounis
(74) *Attorney, Agent, or Firm* — Cynthia W. Flanigan

(57) ABSTRACT

Systems for regenerating an absorbent solution include steam produced by a boiler; a set of pressure turbines fluidly coupled to the boiler for receiving the steam, wherein the set of pressure turbines comprises a high pressure turbine, a medium pressure turbine and a low pressure turbine; and a regenerating system comprising a regenerator for regenerating a rich and/or semi-rich absorbent solution to form a lean absorbent solution in fluid communication with a reboiler, the regenerating system fluidly coupled to the set of pressure turbines, wherein steam from the low pressure turbine provides a heat source for preheating the rich or the semi-rich absorbent solution fed to the regenerator. Also disclosed are processes of use.

16 Claims, 2 Drawing Sheets

(56) References Cited

U.S. PATENT DOCUMENTS

| | | |
|---|---|---|
| 6,883,327 B2 | 4/2005 | Iijima et al. |
| 7,488,463 B2 * | 2/2009 | Iijima et al. .................... 423/220 |
| 8,328,911 B2 * | 12/2012 | Liu et al. .......................... 95/183 |
| 8,470,077 B2 * | 6/2013 | Dube et al. ....................... 95/165 |
| 8,690,992 B2 * | 4/2014 | Dube et al. ....................... 95/165 |
| 2003/0045749 A1 * | 3/2003 | Nishimura et al. ........... 562/523 |
| 2007/0256559 A1 | 11/2007 | Chen et al. |
| 2007/0283813 A1 | 12/2007 | Iijima et al. |
| 2009/0151318 A1 | 6/2009 | Handagama et al. |
| 2009/0205946 A1 | 8/2009 | Reddy et al. |
| 2011/0011088 A1 | 1/2011 | Iijima et al. |
| 2011/0120128 A1 * | 5/2011 | Handagama et al. ........... 60/649 |

OTHER PUBLICATIONS

Yang et al. "MEA-Based CO2 Capture Technology and Its Application in Power Plants", Undated, Paths to Sustainable Energy, North China Electric Power University, China, cover page, pp. 500-510, Nov. 2010.

* cited by examiner

LOW PRESSURE STEAM PRE-HEATERS FOR GAS PURIFICATION SYSTEMS AND PROCESSES OF USE

BACKGROUND

The present disclosure generally relates to gas purification systems and processes of use, wherein an acid component entrained in a flue gas, for example, is separated by wet chemical absorption. In particular, the present disclosure relates to systems and processes configured to utilize low pressure steam as a heat source.

In conventional industrial technologies for gas purification, impurities, such as $H_2S$, $CO_2$ and/or COS are removed from a gas stream such as flue gas, natural gas, syngas or other gas streams by absorption in a liquid solution, e.g., in a liquid solution comprising ammonia and/or one or more amine compounds.

Used liquid solution is subsequently regenerated in a regenerator column to release the impurities comprised in the solution, typically by countercurrent contacting with steam. The steam needed for regeneration is typically produced by power plant turbine system. In addition, a reboiler in fluid communication with the regeneration column may provide further release of impurities comprised in the liquid solution.

In conventional absorption-regeneration processes as described above, regenerated and reboiled liquid solution are typically re-used in another absorption cycle. The reboiled solution may however have a temperature as high as 100-150° C. To enable efficient absorption, the liquid absorbent solutions typically requires cooling before being passed to another round of absorption. Cooling has conventionally been accomplished by heat-exchange with the used liquid solution from absorption.

In general, the energy requirements of a conventional gas purification process are of three types: binding energy, stripping energy and sensible heat. Binding energy is required for breaking the chemical bond formed between the impurities and the liquid solution, whereas stripping energy is required for releasing the impurities from the liquid solution. Sensible heat is in turn needed for heating of the liquid solution prior to regeneration.

In the conventional absorption-regeneration systems and processes, it has been shown that ammonia efficiently removes $CO_2$, as well as other contaminants from a flue gas stream. In one particular application, absorption and removal of $CO_2$ from a flue gas stream with ammonia is conducted at low temperature, for example, between 0 and 20° C. In these types of systems, which are often referred to as a chilled ammonia based systems, the demand on heat required for solvent regeneration is usually covered by steam that condenses on the steam side of the reboiler. The steam is usually taken from the water/steam cycle of the power station. However, steam is mostly extracted from the intermediate pressure/low pressure crossover pipeline between the outlet of the intermediate pressure (IP) turbine and the inlet of the low pressure (LP) turbine. One reason is that the pressure level present in the IP/LP crossover pipeline is applicable for solvent regeneration. However, extracting IP steam from these locations within the power plant causes a penalty in the generation of electricity.

BRIEF SUMMARY

Disclosed herein are systems and processes for regenerating an absorbent solution used in gas purification systems and processes such as a chilled ammonia process.

The system for regenerating an absorbent solution comprises steam produced by a boiler; a set of pressure turbines fluidly coupled to the boiler for receiving the steam, wherein the set of pressure turbines comprises a high pressure turbine, a medium pressure turbine and a low pressure turbine; and a regenerating system fluidly coupled to the set of pressure turbines, wherein the regenerating system comprises a regenerator for regenerating a rich and/or semi-rich absorbent solution to form a lean absorbent solution and a reboiler, wherein steam from the low or medium pressure turbine provides a heat source for heating the rich or the semi-rich absorbent solution fed to the regenerator.

In one embodiment, the process for providing at least a portion of steam produced by a boiler to a regenerating system comprises producing a steam by combusting a fuel source in a boiler; providing at least a portion of the steam to a set of pressure turbines fluidly coupled to the boiler, the set of pressure turbines comprising a high pressure turbine, an intermediate pressure turbine, and a low pressure turbine; extracting at least a portion of a low pressure steam from the low pressure turbine; and utilizing the extracted portion of the low pressure steam as a heat source for a regenerating system fluidly coupled to the low pressure turbine.

The disclosure may be understood more readily by reference to the following detailed description of the various features of the disclosure and the examples included therein.

BRIEF DESCRIPTION OF THE DRAWINGS

Referring now to the figures wherein the like elements are numbered alike.

DETAILED DESCRIPTION

Disclosed herein are systems and processes for purification of a gas stream such as a flue gas. More particularly, the systems and processes are configured to minimize the energy penalties associated with the use of medium and high pressure steam from the power plant for regeneration of a solvent such as ammonia, which typically occurred in prior chilled ammonia processes ("CAP") of a carbon capture system ("CCS"). Instead, at least a portion of the steam from the low pressure turbine is utilized as a pre-heating medium as will be discussed in greater detail below.

Figure 1:
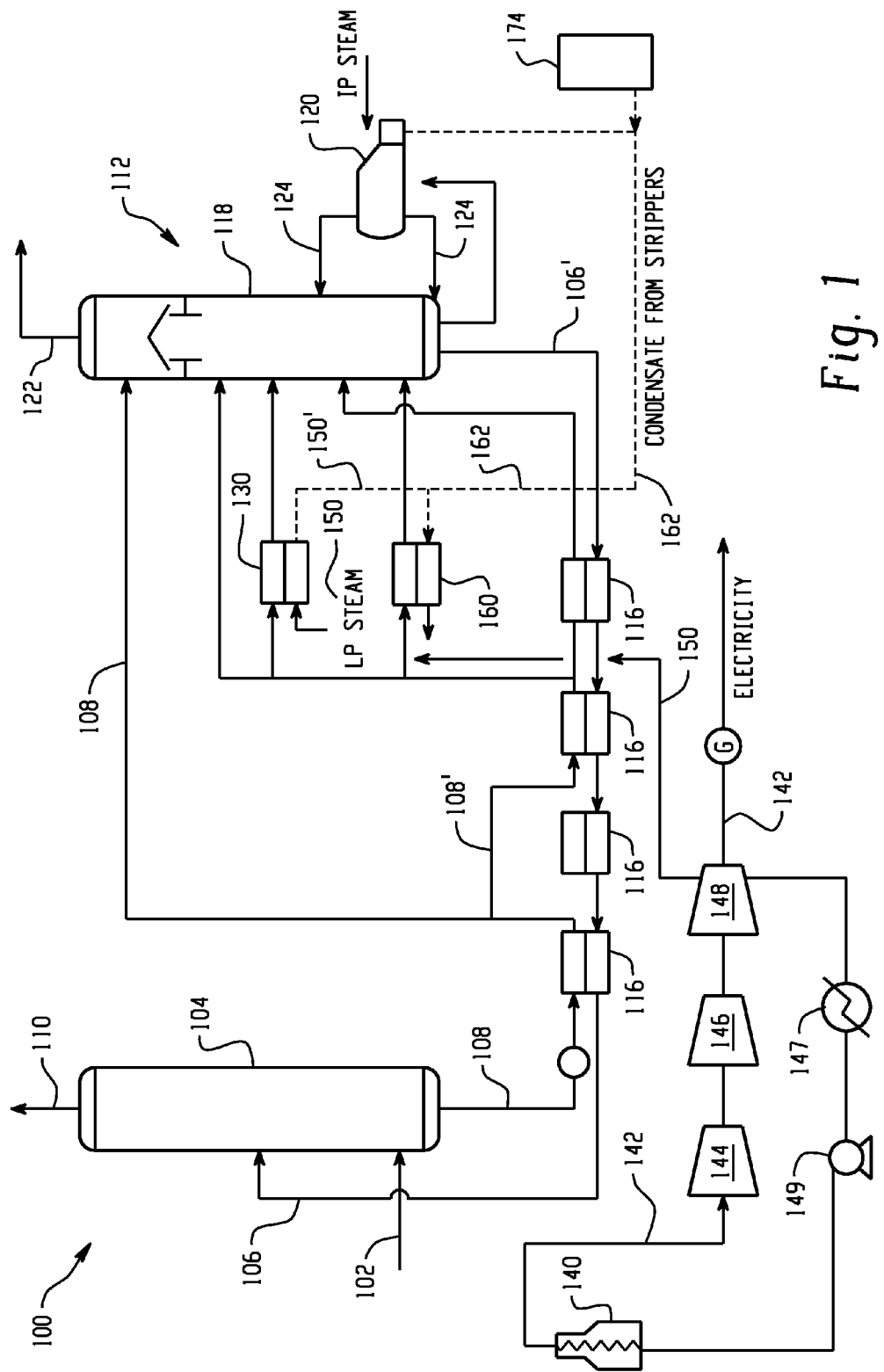
FIG. 1 schematically illustrates a gas purification system in accordance with an embodiment of the present invention.

Referring now to FIG. 1, there is schematically illustrated a purification system 100 in accordance with one embodiment for absorbing an acidic component from a process stream 102. The process stream 102 may be any fluid stream such as, for example, natural gas streams, synthesis gas streams, refinery gas or streams generated from combustion of materials such as coal, natural gas or other fuels. One example of process stream 102 is a flue gas stream generated by combustion of a fuel such as, for example, coal, and provided at an output of a combustion chamber of a fossil fuel fired boiler. Examples of other fuels include, but are not limited to natural gas, synthetic gas (syngas), and petroleum refinery gas. Depending on the type of or source of the process stream, the acidic component(s) may be in a gaseous, liquid or particulate form. For ease of understanding, reference herein will be made to a flue gas stream.

In one embodiment, the flue gas stream 102 contains several acidic components including, but not limited to, carbon dioxide. By the time the flue gas stream 102 enters an absorber 104, the flue gas stream 102 may have undergone treatment to remove particulate matter (e.g., fly ash), as well as sulfur oxides (SOx) and nitrogen oxides (NOx). However, processes may vary from system to system and therefore, such treatments may occur after the flue gas stream 102 passes through the absorber 104, or not at all.

The absorber 104 employs an absorbent solution (disposed therein) that facilitates the absorption and the removal of a gaseous component from the flue gas stream 102. In one embodiment, the absorbent solution includes a chemical solvent and water, where the chemical solvent contains, for example, a nitrogen-based solvent and, in particular, ammonia; primary, secondary and tertiary alkanolamines; primary and secondary amines; sterically hindered amines; and severely sterically hindered secondary aminoether alcohols. Examples of commonly used chemical solvents include, but are not limited to: monoethanolamine (MEA), diethanolamine (DEA), diisopropanolamine (DIPA), N-methylethanolamine, triethanolamine (TEA), N-methyldiethanolamine (MDEA), piperazine, N-methylpiperazine (MP), N-hydroxyethylpiperazine (HEP), 2-amino-2-methyl-1-propanol (AMP), 2-(2-aminoethoxy)ethanol (also called diethyleneglycolamine or DEGA), 2-(2-tert-butylaminopropoxy)ethanol, 2-(2-tert-butylaminoethoxy)ethanol (TBEE), 2-(2-tert-amylaminoethoxy)ethanol, 2-(2-isopropylaminopropoxy)ethanol, 2-(2-(1-methyl-1-ethylpropylamino)ethoxy)ethanol, and the like. The foregoing may be used individually or in combination, and with or without other co-solvents, additives such as anti-foam agents, promoters such as enzymes, buffers, metal salts and the like, as well as corrosion inhibitors.

In one embodiment, the absorbent solution present in the absorber 104 is referred to as a "lean" absorbent solution and/or a "semi-lean" absorbent solution 106. The lean and semi-lean absorbent solutions are capable of absorbing the acidic component(s) from the process stream 102, e.g., the absorbent solutions are not fully saturated or at full absorption capacity. As described herein, the lean absorbent solution is more absorbent than the semi-lean absorbent solution. In one embodiment, described below, the lean and/or semi-lean absorbent solution 106 is provided by the system 100. In one embodiment, a make-up absorbent solution (not shown) is provided to the absorber 104 to supplement the system provided lean and/or semi-lean absorbent solution 102.

In one embodiment, the absorbent solution in absorber 104 is a solution or slurry including ammonia. The ammonia can be in the form of ammonium ion, $NH_4^+$ or in the form of dissolved molecular $NH_3$. The absorption of the acidic component present in flue gas stream 102 is achieved when the absorber 104 is operated at atmospheric pressure and at a low temperature, for example, between zero and twenty degrees Celsius (0-20° C.). In another example, absorption of the acidic component from flue gas stream 102 is achieved when the absorber 104 is operated at atmospheric pressure and at a temperature between zero and ten degrees Celsius (0-10° C.).

Absorption of the acidic component(s) from the flue gas stream 102 occurs by contact between the lean and/or semi-lean absorbent solution 106 and the flue gas stream 102. As will be appreciated, contact between the flue gas stream 102 and the lean and/or semi-lean absorbent solution 106 can occur in any manner in absorber 104. In one example, the flue gas stream 102 enters a lower portion of absorber 104 as shown and travels up a length of the absorber 104 while the lean and/or semi-lean absorbent solution 106 (e.g., an ammonia solution or slurry) enters the absorber 104 at a location above where the flue gas stream 102 enters the absorber 104, and the lean and/or semi-lean absorbent solution 106 flows in a countercurrent direction of the flue gas stream 102. Contact within the absorber 104 between the flue gas stream 102 and the lean and/or semi-lean absorbent solution 106 produces a rich absorbent solution 108 containing the acid gas component from the lean or semi-lean absorbent solution 106. In one example, the rich absorbent solution 108 falls to the lower portion of absorber 104, where it is removed for further processing, while the flue gas stream 102 having a reduced amount of acidic component travels up a length of the absorber 104 and can be released as a cleansed stream 110 from a top portion of the absorber 104 or may be further treated if desired.

The rich absorbent solution 108 exits the absorber 104 at the bottom portion and is provided to a regenerating system shown generally at 112. The rich absorbent solution 108 may travel to the regenerating system 112 via a treatment train that includes, but is not limited to, flash coolers, various pumps, and heat exchangers, as will be described below. In one example, prior to being provided to regenerating system 112, the pressure of the rich absorbent solution 108 can be elevated by one or more pumps to the range of thirty to 435 per square inch (30-435 psi).

The regenerating system 112 includes, for example, several devices or sections, including, but not limited to, a regenerator 118 and a reboiler 120. The regenerator 118 regenerates the rich absorbent solution 108 by heating the solution to a temperature range of about fifty to about two hundred degrees Celsius (about 50-about 200° C.), thereby producing regenerated lean and/or semi-lean absorbent solution 106' as well as a stream of the acidic component 122. The stream of the acidic component 122 may be transferred to a compressing system (not shown), which condenses and, in some embodiments, compresses the acidic component for storage and further use. For reuse in the absorber 104, the regenerated lean and/or semi-lean absorbent 106' is cooled via a treatment train (including pumps, heat exchangers 116 and the like) to the absorber 104 for further absorption of an acidic component from the flue gas stream 102. The reboiler and/or heat exchangers disclosed herein are not intended to be of any type. Exemplary reboilers and heat exchangers may include, without limitation, Kettle types, Shell and tube types, or Plate and Frame types.

As illustrated in FIG. 1, the reboiler 120 provides heated lean absorbent solution 124 to a lower portion of the regenerator 118 that heats the rich absorbent solution to a temperature effective to remove the acid component from the solution, e.g., carbon dioxide gas, thereby producing the regenerated lean and/or semi-lean absorbent solution 106', which is subsequently cooled via heat exchange in the treatment train prior to re-introduction into the absorber 104. In the reboiler, steam condenses at one side and boils the rich absorbent solution at the other side of the reboiler. The boiled vapor travels from the bottom section of the regenerator 118 to the top section while stripping the acidic components from the rich absorbent solution. The acidic vapor is cooled at the top of the regenerator by using a cold slip stream of the rich solution 108. The regenerated lean and/or semi-lean absorbent solution 106' may pass through a series of heat exchangers 116 prior to re-introduction into the absorber unit 104. Steam from the power plant can be utilized as a heat source to reduce the energy requirements for regeneration. For example, the steam 142 may be generated by combustion of a fuel, such as a fossil fuel, in a boiler 140. In one example, steam 142 is transferred from the boiler 140 via a set of pressure turbines. The set of turbines saturates the steam prior to the steam being supplied to the regenerating system 112. In other words, the turbines provide pure steam that is at the boiling point temperature, which corresponds to its pressure and holds all of the moisture in vapor form and does not contain any liquid droplets.

The set of pressure turbines may include, for example, a high pressure (HP) turbine 144, an intermediate or medium pressure (IP) turbine 146, and a low pressure (LP) turbine 148. Optionally, a back pressure turbine (not shown) may also be included. The mechanical energy produced in the turbines by the steam is used to power a generator G for further use, such as in the production of electricity. Steam 142 leaves the set of pressure turbines and proceeds to a condenser 147, which is then provided to the boiler 140 via a pump 149. As will be discussed in greater detail below, a portion of the steam from the LP turbine 148 is utilized as a heat source to effectively lower the demand required for IP steam used in the reboiler, among other advantages. The heated LP stream is generally a saturated steam.

The rich absorbent solution 108 from the absorption unit 104 is preheated via heat exchangers 116 from the regenerated lean solution 106' flowing from the regenerator 118 as shown. In the present invention, the extraction of intermediate pressure steam is decreased by utilizing low pressure steam 150 to preheat at least a portion of a slip stream 108' of the rich absorbent solution via heat exchanger 130 so as to provide increased preheating and operating efficiency as shown in FIG. 1. Use of the low pressure steam 150 minimizes the penalty caused by extraction of the intermediate pressure steam in prior art systems and processes in the generation of electricity since the rich absorbent solution will be preheated to a higher temperature than previously attainable and consequently a lower amount of medium and/or high pressure steam will need to be fed to the reboiler 120 to effect regeneration of the rich absorbent solution. This approach reduces the energy losses of the system and correspondingly reduces the parasitic load of the process.

Alternatively, instead of preheating a portion of the slip stream using the LP steam 150, the total flow rate of the rich absorbent solution 108 can be preheated in this manner, thereby further minimizing the medium and high pressure steam requirements that are typically used in the regeneration reboiler 120.

Optionally, the low pressure steam condensate 150' from heat exchanger 130 may then be mixed with the steam condensate 162 from the reboiler 120 and fed to heat exchanger 160 to provide additional means for preheating the slip stream of the rich absorbent solution 108'.

The low pressure steam can be extracted from the power station within the low pressure turbine or provided by the back pressure turbine that is installed for the purpose of steam supply at an applicable pressure level.

As should be appreciated, the configuration of the set of pressure turbines may vary from system to system, with the various pressure turbines being fluidly connected to one another, the boiler 140, and the regenerating system 112. The term "fluidly coupled" generally means the component is in fluid communication with, or is connected to, either directly or indirectly, to another component via pipes, conduits, conveyors, pumps, and the like.

Figure 2:
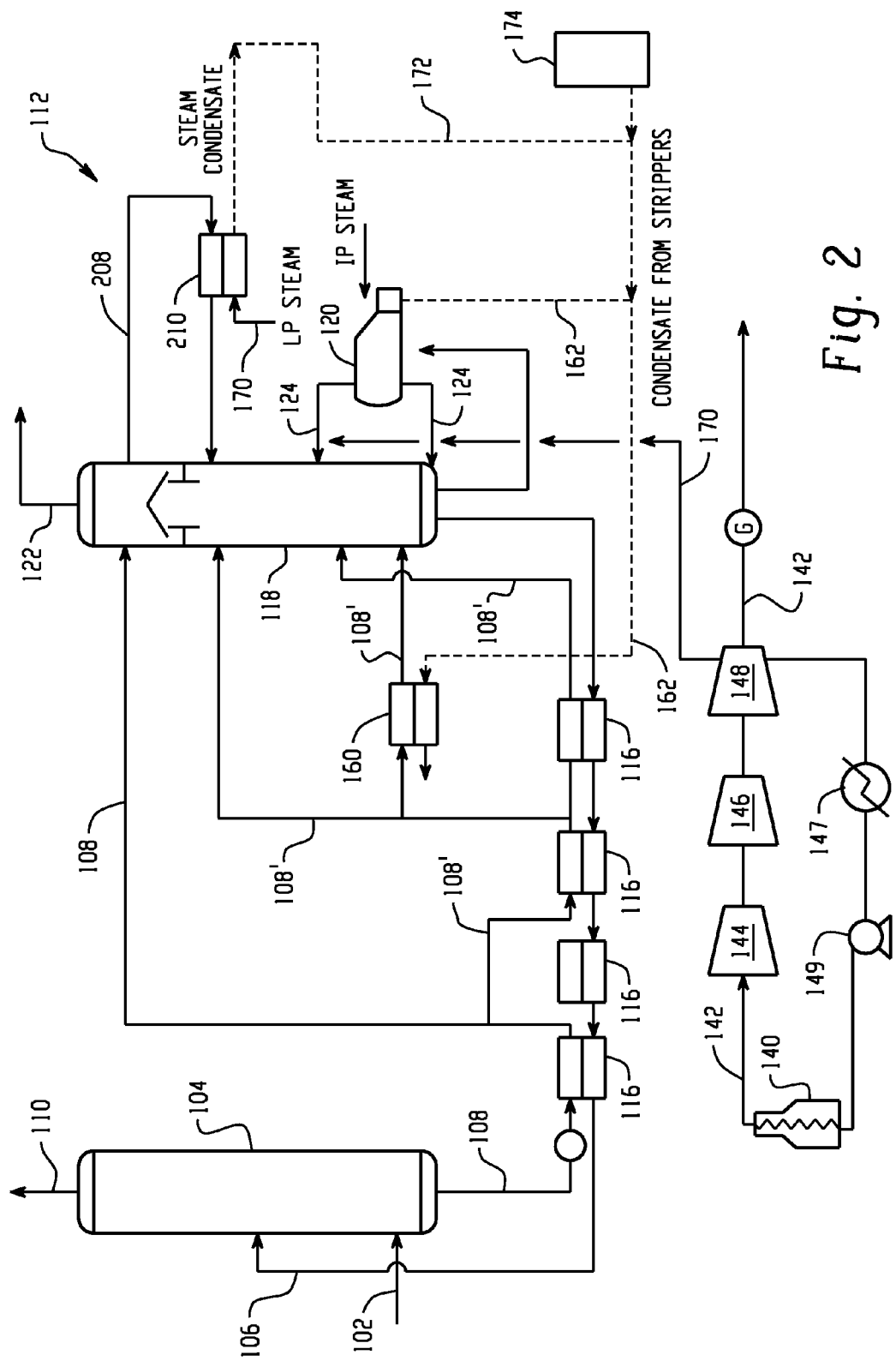
FIG. 2 schematically illustrates a gas purification system in accordance with another embodiment of the present invention.

Referring now to FIG. 2, there is illustrated an alternative embodiment, wherein the low pressure steam is used to preheat a semi-rich absorbent solution from a feedback loop that is discharged from an upper portion of the regenerator 118 and re-introduced into the regenerator 118 at a downstream location. As shown, the semi-rich absorbent solution 208 is extracted from an upper portion of the regenerator 118 and preheated using low pressure steam 170 from the low pressure turbine 148 via heat exchanger 210 prior to return to the regenerator 118. The treatment of the semi-rich absorbent solution in this manner can be in addition to the embodiments disclosed in relation to FIG. 1 or may be by itself depending on the desired system design.

Optionally, the low pressure steam condensate 172 from heat exchanger 210 may then be mixed with the steam condensate 162 from the reboiler 120 and/or a stripper 174 and fed to heat exchanger 160 to provide additional means for preheating the slip stream. The steam condensate from the stripper is low pressure and combined with the regenerator reboiler steam condensate to preheat a portion of the rich solution as clearly shown in FIG. 2. Advantageously, the use of the stripper condensate in this manner further minimizes the intermediate pressure steam demand in the regenerator, and as a consequence, will further reduce the overall parasitic load of the system and process.

The terms "first," "second," and the like, herein do not denote any order, quantity, or importance, but rather are used to distinguish one element from another. The terms "a" and "an" herein do not denote a limitation of quantity, but rather denote the presence of at least one of the referenced item.

While the invention has been described with reference to various exemplary embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

What is claimed is:

1. A process for providing at least a portion of steam produced by a boiler to a regenerating system, the process comprising:
   producing a steam by combusting a fuel source in a boiler;
   providing at least a portion of the steam to a set of pressure turbines fluidly coupled to the boiler, the set of pressure turbines comprising a high pressure turbine, an intermediate pressure turbine, and a low pressure turbine;
   extracting at least a portion of a low pressure steam from the low pressure turbine;
   utilizing the extracted portion of the low pressure steam as a heat source for a regenerating system fluidly coupled to the low pressure turbine
   utilizing a low pressure steam condensate from a stripper; and
   combining the low pressure steam condensate with a regenerator reboiler steam condensate as an additional heat source for heating a solution rich in an acidic component in the regenerating system.

2. The process of claim 1, wherein utilizing the extracted portion of the low pressure steam as the heat source comprises exchanging heat from the low pressure steam with at least a first portion of an absorbent solution rich in an acidic component and feeding the first portion into the regenerator.

3. The process of claim 2, wherein the absorbent solution comprises ammonia.

4. The process of claim 2, wherein the absorbent solution comprises primary, secondary and tertiary alkanolamines; primary and secondary amines; sterically hindered amines; and severely sterically hindered secondary aminoether alcohols.

5. The process of claim 2, wherein the acidic component comprises carbon dioxide.

6. A system for regenerating an absorbent solution, the system comprising:
- steam produced by a boiler;
- a set of pressure turbines fluidly coupled to the boiler for receiving the steam, wherein the set of pressure turbines comprises a high pressure turbine, a medium pressure turbine and a low pressure turbine;
- an absorber vessel using an absorbent solution to capture an acidic component of a process gas to provide an absorbent solution rich in the acidic component;
- a regenerator vessel to regenerate the absorbent solution rich in the acidic component by releasing a portion of the acidic component therefrom to form an absorbent solution lean in acidic acid;
- a reboiler;
- a first heat exchanger, wherein the steam from the low pressure turbine is fluidly coupled to the first heat exchanger, the first heat exchanger configured to heat at least a first portion of the absorbent solution rich in an acidic component provided by the absorber vessel prior to the first portion of the absorbent solution rich in an acidic component being provided to the regenerator; and
- a second heat exchanger for heating at least a second portion of the absorbent solution rich in the acidic component provided from the absorber vessel prior to being provided to the regenerator, wherein condensate of the low pressure steam from the first heat exchanger is mixed with a medium or high pressure steam condensate from the reboiler to provide a heat source to the second heat exchanger.

7. A system for regenerating an absorbent solution, the system comprising:
- steam produced by a boiler;
- a set of pressure turbines fluidly coupled to the boiler for receiving the steam, wherein the set of pressure turbines comprises a high pressure turbine, a medium pressure turbine and a low pressure turbine;
- a regenerating system fluidly coupled to the set of pressure turbines, wherein the regenerating system comprises a regenerator for regenerating an absorbent solution rich in an acidic component to form an absorbent solution lean in the acidic component and a reboiler, wherein steam from the low pressure turbine provides a heat source for heating the absorbent solution rich in an acidic component fed to the regenerator;
- wherein the steam from the low pressure turbine is fluidly coupled to a heat exchanger configured to heat at least a portion of absorbent solution discharged from an upper portion of the regenerator and configured to be fed into the regenerator at a downstream location;
- further comprising a second heat exchanger for heating at least a portion of thea slip stream of the absorbent solution rich in the acidic component provided from the absorber prior to being provided to the regenerator;

wherein condensate of the low pressure steam from the first heat exchanger is mixed with a steam condensate from the reboiler to provide a heat source to the second heat exchanger.

8. The system of claim 6, wherein the absorbent solution comprises ammonia.

9. The system of claim 6, wherein the absorbent solution comprising primary, secondary and tertiary alkanolamines; primary and secondary amines; sterically hindered amines; and severely sterically hindered secondary aminoether alcohols.

10. The system of claim 6, wherein the acid component is $CO_2$.

11. The system of claim 6, wherein the reboiler provides steam condensate to a lower portion of the regenerator vessel at a temperature effective to regenerate the absorbent solution rich in the acidic component to form a regenerated absorbent solution.

12. In a system for regenerating an absorbent solution, the system comprising a first boiler for generating a process stream and steam, an absorber for removing an acidic component from the process stream thereby forming an absorbent solution rich in the acidic component and a cleansed process stream, a set of pressure turbines for generating electricity in fluid communication with the boiler and configured to receive the steam, and a regenerator for regenerating the rich absorbent solution, the improvement comprising:
- at least a portion of the steam from a low pressure turbine in the set of pressure turbines is in fluid communication with a first heat exchanger configured to preheat at least a portion of the absorbent solution rich in the acidic component prior to introduction into the regenerator; and
- a second heat exchanger for heating at least a portion of the absorbent solution rich in the acidic component provided from the absorber vessel prior to being provided to the regenerator;
- wherein condensate of the low pressure steam from the first heat exchanger is mixed with a steam condensate from the reboiler to provide a heat source to the second heat exchanger.

13. The system of claim 12, wherein the absorbent solution comprises ammonia and the acid component comprises carbon dioxide.

14. The system of claim 12, wherein the reboiler and/or the heat exchanger comprise a Kettle type, a Shell and tube type, or a Plate and Frame.

15. The system of claim 6, wherein the absorbent solution rich in the acidic component is provided to the regenerator vessel at a different level than the at least first portion of the absorbent solution rich in the acidic component.

16. The process of claim 2, wherein the absorbent solution rich in the acidic component is provided to the regenerator vessel at a different level than the at least first portion of the absorbent solution rich in the acidic component.

* * * * *